July 5, 1960 A. B. MERRY ET AL 2,943,687
REVERSIBLE EARTH WORKING TILLER
Filed May 2, 1957 2 Sheets-Sheet 1
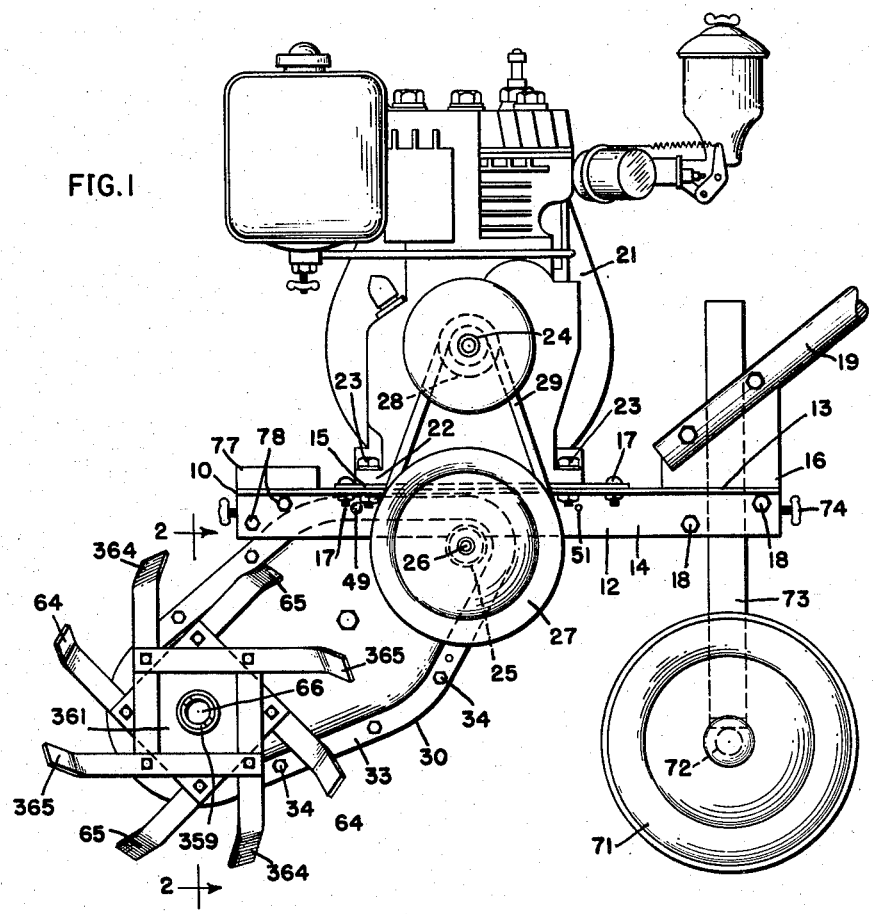
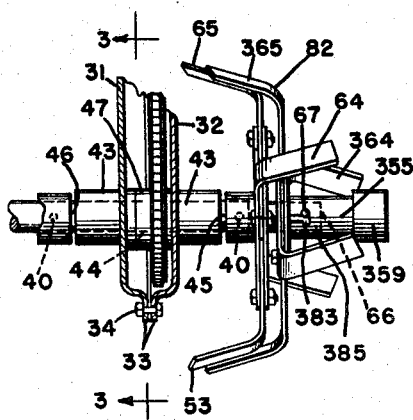
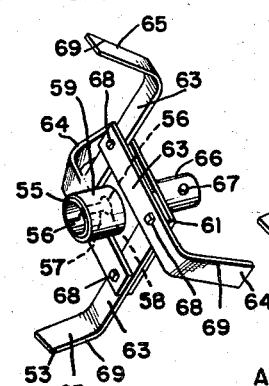
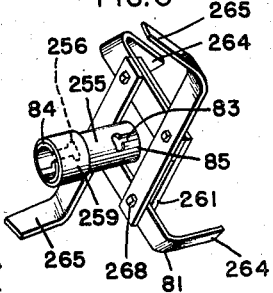
INVENTORS
ALBERT B. MERRY AND
PAUL F. HASTINGS
*Caswell & Lagaard*
ATTORNEYS

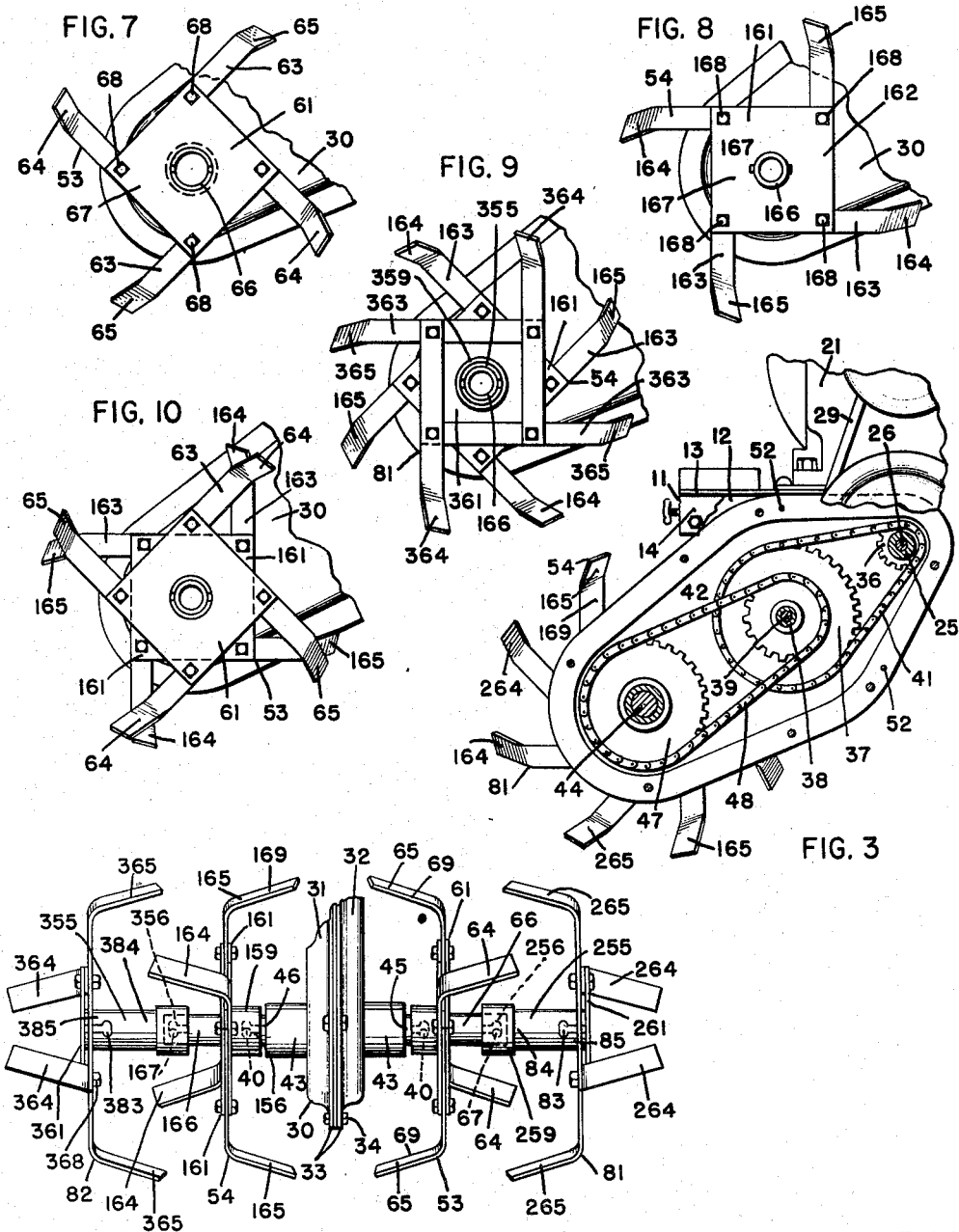

United States Patent Office 2,943,687
Patented July 5, 1960

2,943,687
REVERSIBLE EARTH WORKING TILLER

Albert Berle Merry, N. 5608 Forest Blvd., and Paul F. Hastings, E. 1206 Gordon Ave., both of Spokane, Wash.

Filed May 2, 1957, Ser. No. 656,687

6 Claims. (Cl. 172—125)

The herein disclosed invention relates to earth working apparatus and has for an object to provide apparatus by means of which different types of earth working may be performed with the apparatus.

Another object of the invention resides in providing driving means and an earth working implement driven thereby and capable of performing one type of earth working when driven in one direction and another type of earth working when driven in the opposite direction and adapted to be driven in either direction by said driving means.

An object of the invention resides in providing a rotary ground working implement which when rotated in one direction gives a slash action and when rotated in the opposite direction gives a pick action.

A still further object of the invention resides in constructing the driving means as a case with two coaxial stub shafts one on each side thereof and simultaneously driven and in providing the earth working implements with hubs having sockets at the ends thereof adapted to receive said stub shafts and in further providing locking means acting between said hubs and stub shafts and permitting interchange of said implements from one shaft to the other.

Another object of the invention resides in providing supplemental earth working implements which may be attached to the first named earth working implements to increase the swath of the apparatus.

An object of the invention resides in providing the first named earth working implements with stub shafts extending outwardly from said hubs and coaxial therewith and in providing the hubs on the second named implements with sockets at both ends thereof adapted to be interchangeably mounted on the second named stub shafts.

Another object of the invention resides in providing the earth working implements with elongated blades having earth engaging edges disposed in the surface of a frusto-cone concentric with said member and helically advancing along said surface.

A feature of the invention resides in constructing each of the earth working implements with a polilateral radial plate attached to the hub and the blades with shanks lying along the edges of said plates and projecting outwardly therefrom.

Another object of the invention resides in arranging the shanks to overlap one another at the corners of the plate and in securing the shanks to the plate by bolts extending through the overlapping portions of the same and through said plate.

A still further object of the invention resides in providing as the locking means for the hubs and stub shafts pins projecting radially outwardly from the stub shafts and adapted to be received in T-slots formed in said hubs.

Other objects of the invention reside in the novel combination and arrangement of parts and in the details of construction hereinafter illustrated and/or described.

In the drawings:

Fig. 1 is an elevational view of earth working apparatus illustrating an embodiment of the invention and showing the implements installed for slash action with minimum swath.

Fig. 2 is an elevational-sectional view taken on line 2—2 of Fig. 1.

Fig. 3 is an elevational-sectional view taken on line 3—3 of Fig. 2.

Fig. 4 is a view similar to Fig. 2 and illustrating the earth working implements arranged for maximum swath.

Fig. 5 is a perspective view of one of the earth working implements of the invention.

Fig. 6 is a perspective view of one of the supplemental earth working implements.

Fig. 7 is an end view of one of the implements mounted on the power unit and arranged for slash action.

Fig. 8 is a view similar to Fig. 7 showing the implement arranged for pick action.

Fig. 9 is a view similar to Fig. 8 and showing both implements attached to the power unit and arranged for pick action.

Fig. 10 is a view similar to Fig. 9 and showing the two implements arranged to produce a combined slash and pick action.

The invention utilizes a power unit such as shown in the copending application of Albert B. Merry and Paul F. Hastings for Motor Power Unit, Serial No. 585,249. This power unit comprises a frame 10 which consists of two spaced longitudinally extending angle-shaped frame members 11 and 12 having horizontal flanges 13 and vertical flanges 14. These frame members are secured together at the forward portions of the same by means of a motor base plate 15 and at the rearward ends of the same by means of a mounting 16. The plate 15 is bolted to the flanges 13 by means of bolts 17 while the mounting 16 is secured to the flanges 14 by means of bolts 18. Another mounting 77, similar to the mounting 16, may be attached to the frame members 11 and 12 at the forward portion of the same by means of bolts 78. The mounting 16 has attached to it a handlebar 19 which may be of any suitable construction such as is now well known in the art and which extends rearwardly and upwardly from said mounting.

Resting on the motor base plate 15 is a gasoline motor 21. This motor has a base 22 which overlies the plate 15 and which is bolted to said base plate and to the flanges 13 by means of bolts 23. The motor also includes a crank shaft 24 and is so arranged that the crank shaft extends transversely of the frame 10. Since gasoline motors are well known in the art and since the construction of the same forms no particular feature of the instant invention, the motor has not been illustrated in detail nor will it be further described.

Welded to the lowermost portions of the flanges 14 of the frame members 11 and 12, are two aligning bearings 25. These bearings support a countershaft 26 which extends transversely of the frame 10 and parallel to the crank shaft 24 of motor 21. The said countershaft extends outwardly beyond the frame 10 and has mounted on it a sheave 27. Also on the crank shaft 24 is a sheave 28 which lies in the plane of the sheave 27. A V-belt 29 passes over these sheaves and drives the shaft 26 at a reduced rate of speed.

Disposed below the frame 10 is an elongated transmission case 30 formed in two halves 31 and 32. The halves 31 and 32 are provided with flanges 33 which are bolted together by means of bolts 34. Mounted on the countershaft 26 and between the bearings 25 is a sprocket wheel 36. This sprocket wheel is situated to one side of the case and in alignment with another sprocket wheel 37 disposed near the center of the case. The sprocket wheel 37 rotates freely on a tubular shaft 38 which is attached to the case 30 by means of a bolt 39 extending through the said tubular shaft and the two halves 31 and 32 of the case. A chain 41 passes over the two sprocket wheels 36 and 37. Wheel 36 is smaller than the wheel 37 so that the wheel 37 is driven at a reduced rate of speed. Attached to the sprocket wheel 37 by welding is another sprocket wheel 42 which is of smaller diameter and which is also journaled on the tubular shaft 38. These sprocket wheels travel together as a unit. At the lower end of the case is provided two bearings 43 which are welded to the two halves 31 and 32 and whose bores are in alignment. These bearings rotatably support a driven shaft 44. This shaft has shaft extensions 45 and 46 which serve as stub shafts and to which the ground working implements of the invention may be attached. Attached to the stub shafts 45 and 46 are pins 40 which are disposed radially thereof and project outwardly thereof. Mounted on the shaft 44 and within the case 30 is a sprocket wheel 47. This sprocket wheel is in the plane of sprocket wheel 42 and a chain 48 passes over said sprocket wheels and drives the shaft 44. Sprocket wheel 42 is smaller than sprocket wheel 47 and the shaft 44 is hence driven at a further reduced rate of speed. By means of the bearings 25 and the arrangement of the parts, the case may swing on the countershaft 37 as a pivot from a forward to a rearward position. The said case may be held in either of these positions by means of a pin 49 which passes through either of two holes 51 in the flange 14 of the frame member 12 and through corresponding holes 52 in the flanges 33 of the case 30.

The frame 10 may be supported at its rearward end by means of supporting wheels 71. These wheels are rotatably mounted on an axle 72 which has welded to it an upright 73. This upright extends through the mounting 16 and is held in vertically adjusted position relative thereto by means of a thumb screw 74.

The invention proper consists of two ground working implements 53 and 54 shown in detail in Figs. 2 and 4. These implements are similar in construction except that one is mounted on the stub shaft 45 at the left-hand side of the power unit while the implement 54 is mounted on the right-hand side of the power unit. Due to the similarity of said implements, only the implement 53 will be described in detail. This implement is shown in perspective in Fig. 5 and comprises a hub 55 which is formed with two T-slots 56. These slots have a stem 57 which extends through the end of the hub and which lies longitudinally with respect thereto. The said slots further have a transverse portion 58 which extends circumferentially of the hub and which projects on either side of the stem 57. The slots 56 are so designed that the pins 40 may pass through the stem portions 57 of said slots and into either end of the transverse portion 58 when the hub 55 is applied to one of the stub shafts. The slots 56 are covered on the exterior by means of a sleeve 59 which encircles the hub 55 and is secured to said hub. The hub has welded to it a radial plate 61 rectangular in form and which has edges 62 lying at right angles to one another. Mounted on the plate 61 are blades 64 and 65 which have shanks 63 extend along the edges 62 of said plate. These shanks have overlapping portions disposed at the corners of the plate and bolts 68 extend through these portions and through said plate and securely attach the blades to the plate. The shanks are assembled on the plate so that the blades 64 extend to one side of the plate and the blades 65 extend to the other side of the plate. The blades 64 and 65 are so arranged that the corresponding edges 69 thereof lie in a frusto-conical surface concentric with the axis of the hub 55. These blades also advance helically with respect to the axis of the implement. Concentric with the hub 55 is a stub shaft 66 which has mounted in it a pin 67 extending radially with respect thereto and similar to the pin 40.

The implement 54 is constructed similarly to the implement 53 and for this reason the said implement will not be described in detail, and the same reference numerals preceded by the digit 1 will be used to designate the corresponding parts. This implement differs only in that the hub 155 thereof is disposed on the opposite side of the plate 162 and the stub shaft 166 likewise is disposed on the opposite side of said plate.

In conjunction with the ground working implements 53 and 54 two supplemental ground working implements 81 and 82 are used and which are adapted to be mounted on the implements 53 and 54. These implements are similar in construction and also similar to the implements 53 and 54 and for this reason the description thereof will not be repeated and the same reference numerals as those used to designate the parts of the implement 53, preceded by the digit "2" for implement 81 and "3" for implement 82, will be used to designate the similar parts. The implement 81 is shown in Fig. 6 and differs only from the implement 53 in that the stub shaft 66 has been omitted and the hub 255 made longer and the bore thereof made open at both of its ends 84 and 85 to permit of application of said implement to the stub shafts 66 from either end of said hub. T-slot 256 is, as in the case of the T-slot 56, applied to the outer end 84 of hub 255. In addition, a second T-slot 83 is employed disposed at the opposite end 85 of said hub. The slot 83 functions in the same manner as the slot 256. This slot being closer to the plate 261 than the slot 256 causes the blades 265 to intermesh with the blades 165 of implement 54 and blades 365 of implement 82 to intermesh with blade 65 of implement 53 when the implement is applied as shown for implements 53 and 82 in Fig. 2 and to reduce the width of the swath. When the implement is applied as shown in Fig. 4, the blades of the implement 81 clear the blades of the implement 53 and a maximum swath results. Again, the implements 81 and 82 are interchangeable and may be applied to either of the stub shafts 66 or 166.

When the apparatus is to be used for cultivating, the transmission case 30 is moved to its forward position as shown in Fig. 1 and locked in place by the pin 49. Usually slash action is desired in cultivating and such action serves to shear off the tops of the weeds at or below the level of the ground. In such case, the implement 53 is applied to the left-hand side of the power unit and to the stub shaft 45. In a similar manner, the implement 54 is applied to the right-hand side of the power unit and to the stub shaft 46. The arrangement is shown in Figs. 1 and 2. It will be noted that the blades 65 extend toward the case 30 and clear the same while the blades 64 extend outwardly therefrom. At the same time, the edges 69 of said blades engage the ground as shown in Fig. 7. If a wide swath is desired, the implements 81 and 82 are employed, and which are attached to the stub shafts 66 and 166 of the implements 53 and 54 with the ends 84 of the hub 255 receiving said stub shafts and the pins 67 and 167 on said stub shafts entering the slots 256 and 356. The parts would then be arranged as shown in Fig. 4. If, however, a narrow swath was desired, the implement 82, which would normally go on the right-hand side of the machine, would be reversed and applied to the stub shaft 66 with the end 385 of said hub receiving the said stub shaft. Pin 67 would in such case be received in the slot 383 of said hub and the parts would be arranged as shown in Fig. 2. The other implement 81 would similarly be applied to the implement 54. If pick action is desired, the implements 53 and 54 would be reversed, the implement 53 being applied to stub shaft 46 and the implement 54 would be applied to stub shaft 45. Similarly, the implements 81 and 82 would be applied to the implements 53 and 54 and accompany the same to give the desired action. The arrangement of the blades to procure pick action is shown with a single implement in Fig. 8 and with two implements in Fig. 9. If it is desired to use the apparatus for preparing a seed bed, it may be advantageous to move the transmission case 30 to its rearward position and to attach the wheels 71 to the mounting 77 located at the front of the frame 10. When so disposed, the earth working implements are at the rear of the machine and the wheels do not form grooves in the worked earth as is the case with the implements in the front of the machine. However, when cultivating, it becomes desirable to have the implements at the front of the machine so that movement of the power unit to cause the implements to move away from the plants, will immediately effect such purpose. If cultivation is attempted with the wheels at the rear and the power unit is moved in a direction away from the plants, the implements are caused to first further approach the plants before receding therefrom, thus frequently injuring the plants. Combined slash and pick action can also be procured by arranging the implements as shown in Fig. 10.

The advantages of the invention are manifest. The implements are easily and quickly applied to the stub shafts of the power unit. Either slash or pick action may be procured or a combination of the two as desired. Since the supplemental implements are mountable from either end and may be attached to either main implement, the same may be mounted so as to produce a wide or narrow swath with either slash or pick action. Also, the transmission case may be shifted to permit of using the apparatus for preparing a seed bed or for cultivating as desired. The blades are easily removed from the implements and replaced when worn or where breakage occurs.

Changes in the specific form of the invention, as herein described, may be made within the scope of what is claimed without departing from the spirit of the invention.

Having described the invention, what is claimed as new and desired to be protected by Letters Patent is:

1. In earth working apparatus, a transmission case, two coaxial driven stub shafts rotatably supported one on each side of said case and accessible exteriorly of the case, a pair of rotatable earth working implements each performing one type of earth working operation when rotated in one direction and another type of earth working operation when rotated in the opposite direction, hubs on said implements having axially extending sockets receiving said stub shafts, one of said sockets opening outwardly from one end of one of said implements and the other socket opening outwardly from the opposite end of the other of said implements to cause both implements to perform the same type of operation when simultaneously attached to said stub shafts, said sockets being applicable to either of said stub shafts to interchangeably support said implements on said rotatable members and cause said implements to perform either of said earth working operations, each of said hubs having a T-shaped slot therein, and each of said stub shafts having a pin received in the slot of either of said hubs.

2. In earth working apparatus, a transmission case, two coaxial driven stub shafts rotatably supported one on each side of said case and accessible exteriorly of the case, a pair of rotatable earth working implements each performing one type of earth working operation when rotated in one direction and another type of earth working operation when rotated in the opposite direction, hubs on said implements having axially extending sockets receiving said stub shafts, one of said sockets opening outwardly from one end of one of said implements and the other socket opening outwardly from the opposite end of the other of said implements to cause both implements to perform the same type of operation when simultaneously attached to said stub shafts, said sockets being applicable to either of said stub shafts to interchangeably support said implements on said rotatable members and cause said implements to perform either of said earth working operations, each of said hubs having a T-shaped slot therein with the stem thereof running longitudinally and extending through the outer ends of said hubs and with the crossbars running circumferentially, and each of said stub shafts having a pin adapted to be received in the slot of either of said hubs and adapted to be lodged in one end or the other of either of said slots.

3. In earth working apparatus, a support, two coaxial rotatable power driven members disposed one on each side of said support and accessible outwardly thereof, a pair of rotatable earth working implements each performing one type of earth working operation when rotated in one direction and another type of earth working operation when rotated in the opposite direction, attaching means acting between said implements and said rotatable members, said attaching means being applied to one end of one of said implements and to the opposite end of the other implement to cause both implements to perform the same type of earth working operation when simultaneously attached to said rotatable members, said attaching means being applicable to either of said rotatable members to interchangeably support said implements on said rotatable members and cause said implements to perform either of said earth working operations, supplemental earth working implements similar to said first named earth working implements, and attaching means at both ends of each thereof for attaching said supplemental implements at either end to either of said first named implements.

4. In earth working apparatus, a transmission case, two coaxial power driven stub shafts rotatably supported one on each side of said case and accessible exteriorly of the case, a pair of rotatable earth working implements each performing one type of earth working operation when rotated in one direction and another type of earth working operation when rotated in the opposite direction, centers on said implements and having axially extending sockets receiving said stub shafts, one of said sockets opening outwardly from one end of one of said implements and the other socket opening outwardly from the opposite end of the other of said implements to cause both implements to perform the same operation when simultaneously attached to said stub shafts, said sockets being applicable to either of said stub shafts to interchangeably support said devices on said rotatable members and cause said implements to perform either of said earth working operations and stub shafts on the outer ends of said centers, supplemental earth working implements similar to said first named earth working implements and having sockets at both ends of the centers thereof, each of said sockets being applicable to either of said last named stub shafts and locking means for locking said stub shafts to said centers.

5. In earth working apparatus, a support, two coaxial rotatable power driven members disposed one on each side of said support and accessible outwardly thereof, a pair of rotatable earth working implements each comprising a hub having an axially extending socket at one end and a stub shaft at its other end, a center secured to said hub and blades attached to said center and arranged in helical formation, said implements performing a slashing earth working operation when rotated in one direction and a picking earth working operation when rotated in the opposite direction, the sockets of said implements being applicable to either of said rotatable members, attaching means between said rotatable members and the portions of the hubs having the sockets therein, supplemental earth working implements similar to said first named earth working implements and having hubs formed with axially extending sockets at both ends thereof, said sockets of each hub being each applicable to either of said stub shafts, and attaching means between said stub shafts and the portions of said hubs of said supplemental earth working implements having the sockets, one of said attaching means of each supplemental implement being closer to said center thereof than the other.

6. In earth working apparatus, a support, two coaxial rotatable power driven members disposed one on each side of said support and accessible outwardly thereof, pins extending radially outwardly from each thereof, a pair of rotatable earth working implements each comprising a hub having an axially extending socket at one end and a T-shaped slot therein with the stem thereof running longitudinally, said hub having a stub shaft at its other end, a pin extending outwardly from said stub shaft, a center secured to said hub and blades attached to said center and arranged in helical formation, said implements performing a slashing earth working operation when rotated in one direction and a picking earth working operation when rotated in the opposite direction, the sockets of said implements being applicable to either of said rotatable members with the pin of said members entering said T-shaped slot, supplemental earth working implements similar to said first named earth working implements and having hubs formed with axially extending sockets at both ends thereof and having T-shaped slots therein with the stems thereof running longitudinally, said sockets of each hub being each applicable to either of said stub shafts with the pins of said stub shafts received in the T-shaped slots of said supplemental implements, one of said T-shaped slots of each supplemental implement being closer to said center thereof than the other.

References Cited in the file of this patent
UNITED STATES PATENTS

| | | |
|---|---|---|
| 2,012,434 | Pedersen | Aug. 27, 1935 |
| 2,176,261 | Kelsey | Oct. 17, 1939 |
| 2,477,662 | Seaman | Aug. 2, 1949 |
| 2,617,343 | Warne | Nov. 11, 1952 |
| 2,765,719 | Day et al. | Oct. 9, 1956 |
| 2,847,922 | Stephenson | Aug. 19, 1958 |
| 2,847,924 | Quick | Aug. 19, 1958 |

FOREIGN PATENTS

| | | |
|---|---|---|
| 159,354 | Australia | Oct. 18, 1954 |